S. T. FREAS.
DETACHABLE TOOTH FOR METAL SAWS.
APPLICATION FILED APR. 9, 1915.
1,148,374. Patented July 27, 1915.
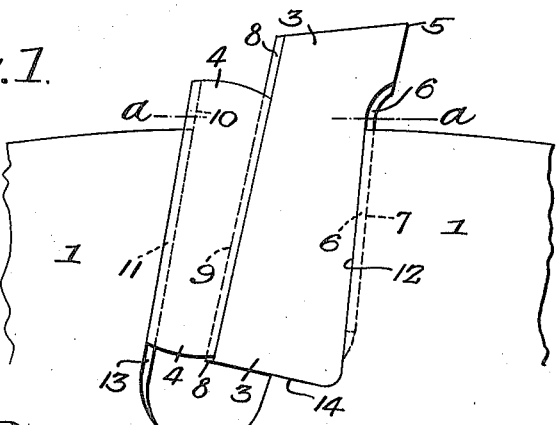
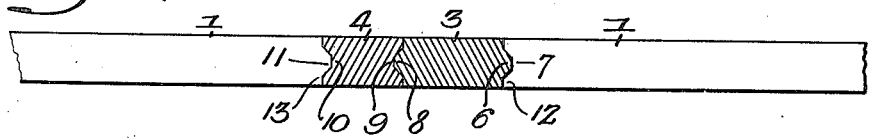
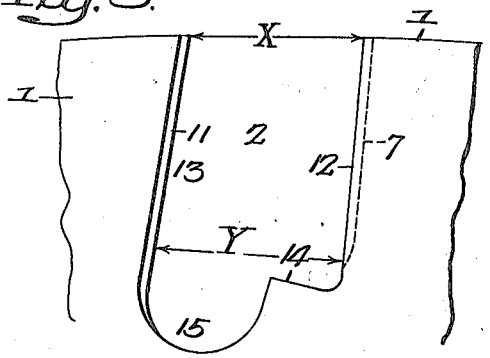
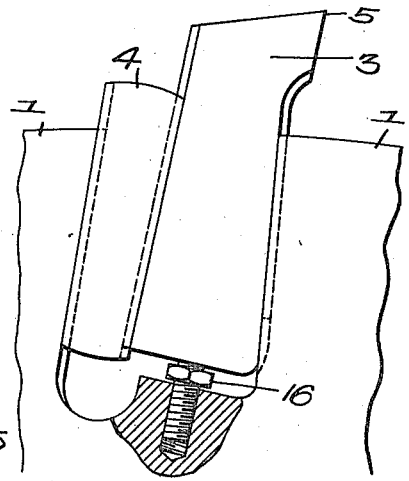
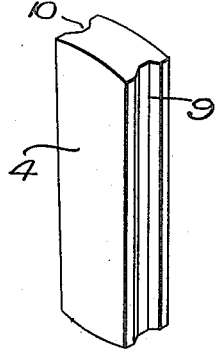
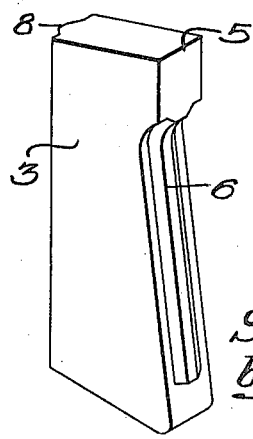
Inventor:—
Samuel T. Freas.
by his Attorneys

UNITED STATES PATENT OFFICE.

SAMUEL T. FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

DETACHABLE TOOTH FOR METAL SAWS.

1,148,374.    Specification of Letters Patent.    Patented July 27, 1915.

Application filed April 9, 1915. Serial No. 20,315.

*To all whom it may concern:*

Be it known that I, SAMUEL T. FREAS, a citizen of the United States, and a resident of Trenton, county of Mercer, State of New Jersey, have invented certain Improvements in Detachable Teeth for Metal Saws, of which the following is a specification.

My invention relates to certain improvements in insertible saw teeth of the type used particularly in metal saws, and the object of my invention is to make a detachable tooth, and so design the saw that while the tooth is secured in place by a driven wedge, it is held in place by the shape of the opening in which the tooth is mounted.

In the accompanying drawings; Figure 1 is a side view of sufficient of a circular saw illustrating one tooth in position; Fig. 2 is a sectional plan view on the line *a—a* Fig. 1; Fig. 3 is a side view of the blade with the tooth and wedge detached; Fig. 4 is a perspective view of the tooth; Fig. 5 is a perspective view of the wedge; and Fig. 6 is a view illustrating an adjusting screw located under the base of the tooth.

1 is a saw blade having an opening 2. 3 is the tooth, and 4 is a wedge located back of the tooth. The tooth has a cutting face 5 of any shape desired, and the front edge of the tooth in the present instance has a rib 6 which enters a recess 7 in the front wall of the opening 2. On the rear of the tooth is a rib 8 adapted to a groove 9 in the wedge 4, and in the rear edge of the wedge is a groove 10 to receive the rib 11 on the rear wall of the opening 2. The wedge is wider at the periphery of the blade than at the inner edge, and is driven from the outside. It will be noticed that the opening 2 in the blade is narrower at the outer end X than at the inner end Y. The front wall 12 of the opening 2 is inclined about four degrees in practice, while the rear wall 13 is inclined about two degrees. The tooth 3 is wider at the base than at the outer end, while the wedge is wider at the outer end than at the inner end, as above described, and the tapers are such that when the tooth and the wedge are assembled in the opening 2, the combined width is greater at the base than at the outer end. Consequently the tooth is held rigidly in position by the tapered walls of the opening, but when the wedge is driven out of position, then the tooth can be released and replaced if necessary, or adjusted, if found desirable, and when the wedge is driven in place again, the tooth is firmly held by the walls of the opening.

The base of the opening is preferably made as shown in Fig. 1, having a shoulder 14 and a recess 15 between the shoulder and the rear wall for the projection on the wedge, and in some instances an adjusting screw 16, as illustrated in Fig. 6, may be located in the blade to bear against the base of the tooth, so that by adjusting the screw, the tooth is properly located in respect to the blade, and in some instances the screw may be carried by the tooth instead of the blade, but I prefer the construction illustrated in the drawings.

I claim:

1. The combination in a saw, of a blade having an opening narrower at the outer edge than at the base, with a tooth and wedge located in the opening, the wedge being wider at the outer end than at the base.

2. The combination in a saw of a blade having an opening greater in width at the base than at the outer edge, with a tapered tooth narrower at the outer end than at the base, and a wedge back of the tooth wider at the outer end than at the base, the wedge and the tooth when in position being retained by the taper of the walls of the opening.

SAMUEL T. FREAS.